United States Patent [19]

Salyer

[11] Patent Number: 4,711,813
[45] Date of Patent: Dec. 8, 1987

[54] POLYETHYLENE COMPOSITES CONTAINING A PHASE CHANGE MATERIAL HAVING A C14 STRAIGHT CHAIN HYDROCARBON

[75] Inventor: Ival O. Salyer, Dayton, Ohio

[73] Assignee: University of Dayton, Dayton, Ohio

[21] Appl. No.: 801,127

[22] Filed: Nov. 22, 1985

[51] Int. Cl.$^4$ .............. C08K 5/01; C08K 9/12; C09K 5/06; C09K 3/18
[52] U.S. Cl. ..................... 428/402; 252/70; 523/205; 524/8; 524/409; 524/411; 524/464; 524/476; 524/477; 524/487
[58] Field of Search ........... 428/402; 524/8, 409, 524/411, 476, 477, 487, 464; 523/205; 252/70

[56] References Cited

U.S. PATENT DOCUMENTS

| 4,003,426 | 1/1977 | Best et al. ............... 252/70 |
| 4,182,398 | 1/1980 | Salyer ..................... 165/1 |
| 4,253,983 | 3/1981 | Blaine ..................... 252/70 |
| 4,259,198 | 3/1981 | Kreibich et al. .......... 252/70 |
| 4,273,667 | 6/1981 | Kent et al. .............. 252/70 |
| 4,463,799 | 8/1984 | Takahashi et al. ......... 252/70 |
| 4,470,917 | 9/1984 | Hawe et al. .............. 252/70 |
| 4,504,402 | 3/1985 | Chen et al. .............. 252/70 |
| 4,505,953 | 3/1985 | Chen et al. .............. 427/212 |
| 4,513,053 | 4/1985 | Chen et al. .............. 428/221 |
| 4,545,916 | 10/1985 | Chalk et al. ............ 252/70 |
| 4,561,989 | 12/1985 | Wada et al. .............. 252/70 |

FOREIGN PATENT DOCUMENTS

| 0022717 | 1/1981 | European Pat. Off. ........ 252/70 |
| 3045842 | 7/1982 | Fed. Rep. of Germany ...... 252/70 |
| 2368529 | 6/1978 | France .................... 252/70 |
| 0042380 | 4/1979 | Japan ..................... 252/70 |
| 0142276 | 8/1984 | Japan ..................... 252/70 |
| 0170180 | 9/1984 | Japan ..................... 252/70 |
| 0232164 | 12/1984 | Japan ..................... 252/70 |
| 0086188 | 5/1985 | Japan ..................... 252/70 |
| 0086191 | 5/1985 | Japan ..................... 252/70 |

Primary Examiner—Herbert J. Lilling
Attorney, Agent, or Firm—Biebel, French & Nauman

[57] ABSTRACT

A composite useful in thermal energy storage, said composite being formed of a polyethylene matrix having a straight chain alkyl hydrocarbon incorporated therein, said polyethylene being crosslinked to such a degree that said polyethylene matrix is form stable and said polyethylene matrix is capable of absorbing at least 10% by weight of said straight chain alkyl hydrocarbon; the composite is useful in forming pellets or sheets having thermal energy storage characteristics.

36 Claims, No Drawings

POLYETHYLENE COMPOSITES CONTAINING A PHASE CHANGE MATERIAL HAVING A C14 STRAIGHT CHAIN HYDROCARBON

GOVERNMENT RIGHTS

The United States has certain rights in this invention.

BACKGROUND OF THE INVENTION

The present invention relates to a pellet or sheet useful in thermal energy storage and, more particularly, to a pellet or sheet formed from crosslinked polyethylene and having a straight chain crystalline alkyl hydrocarbon therein.

A great deal of interest exists in phase change thermal energy storage systems because of their inherent ability to store and release large quantities of heat to their surrounding environment as temperatures drop below or exceed predetermined levels. These systems are of particular interest in the architectural and building trades where climate control and its concomitant energy consumption is one of the principal considerations in building design and material selection.

A variety of building materials and techniques, including structural elements which incorporate phase change materials, have previously been used to conserve heat or cool and thereby reduce energy costs. For example, phase change materials have been incorporated into concrete such that energy in excess of that necessary to obtain comfort conditions is inherently absorbed and released as required to maintain the comfort range. Thus, in the winter months, phase change materials incorporated into the concrete walls or floors of buildings absorb solar energy during daylight hours and release it to the interior at night as temperatures decrease. In the summer months, the same phase change materials, due to their thermostatic character, conserve coolness by absorbing cool from the night air, and releasing it during the day.

Concrete materials incorporating phase change materials are more desirable than elements which store only sensible heat because they have a higher capacity to store energy, plus they absorb and release a large quantity of energy over a very narrow temperature range.

A phase change material utilizes its latent heat of fusion for thermal storage. The latent heat of fusion is substantially greater than the sensible heat capacity of the material. Stated differently, the amount of energy which a material absorbs upon melting, or releases upon freezing, is much greater than the amount of energy which it absorbs or releases upon increasing or decreasing in temperature 1° C. Upon melting and freezing, per unit weight, a phase change material absorbs and releases substantially more energy than a sensible heat storage material which is heated or cooled to the same temperature range. In contrast to a sensible heat storage material which absorbs and releases energy essentially uniformly over a broad temperature range, a phase change material absorbs and releases a large quantity of energy in the vicinity of its melting/freezing point. In addition to their latent storage capacity, the phase change materials also store and release sensible energy as well. Thus, the latent storage in phase change materials is always augmented to a significant extent by their sensible storage capacity. This advantage is put to good use in buildings where space is at a premium and energy storage and release are required within a very narrow comfort range.

It has long been recognized that an effective phase change material, which could store and release thermal energy within the temperature range of 10°-65° C., and could be economically incorporated into concrete, would have broad utility for many heating and cooling applications including solar passive, bridge deck deicing, etc.

Widespread use of the direct incorporation of phase change materials into concrete has not been achieved because the phase change material adversely affects the physical properties of the concrete. Direct incorporation of phase change materials into concrete reduces the strength properties. Thus, the degree of concrete crosslinking required to achieve optimum physical properties is not obtained in the direct presence of the phase change material.

It has been suggested to encapsulate phase change materials in pellets for incorporation into concrete and the like. U.S. Pat. No. 4,504,402 to Chen teaches an encapsulated phase change material which is prepared by forming a shell about a phase change composition in compacted powder form. These pellets, however, are comparatively expensive to manufacture.

SUMMARY OF THE INVENTION

The present invention is directed to a composite useful in thermal energy storage. The composite is formed from crosslinked polyethylene having a straight chain alkyl hydrocarbon incorporated therein as a phase change material. In accordance with one embodiment of the invention, the composite is a pellet which is suitable for incorporation into concrete in building materials and the like. In accordance with another embodiment, the composite is a sheet material useful as a wall or floor covering. The polyethylene is preferably high density polyethylene, although, low density polyethylenes may also be useful.

A more particular embodiment of the present invention resides in a pellet useful in thermal energy storage, said pellet being formed from high density or low density polyethylene and having a straight chain crystalline alkyl hydrocarbon absorbed therein, said polyethylene being crosslinked to such a degree that said pellet maintains its shape (form stability) upon heating and, at the same time, is capable of absorbing at least 10% by weight, and preferably, at least 50% by weight, of said straight chain crystalline alkyl hydrocarbon.

Another embodiment of the present invention resides in a thermal storage material comprising a non-polymeric cementitious matrix having pellets containing a phase change material dispersed therein, said pellets being formed from high density or low density polyethylene, said polyethylene being crosslinked to such a degree that said pellets are form stable and, at the same time, are capable of absorbing at least 10% by weight, and preferably, at least 50% by weight, of said straight chain alkyl hydrocarbon.

In a preferred embodiment, the alkyl hydrocarbon in the composite is comprised of one or more crystalline straight chain alkyl hydrocarbons having 14 or more carbon atoms and heats of fusion greater than 30 cal/g. The melting and freezing point of the alkyl hydrocarbon is in the range of 40°-95° F., and preferably, 65°-75° F.

DETAILED DESCRIPTION OF THE INVENTION

The composites of the present invention are useful in thermal energy storage.

The pellets of the present invention may be formed by the use of commercially available high density or low density polyethylene pellets as the starting component. The term "high density polyethylene" is used herein as it is used in the art, i.e., to refer to polyethylene ranging in density from about 0.940 to about 0.970 g/cc. The term "low density polyethylene" refers to polyethylenes ranging in density from 0.910 to 0.940 g/cc. Representative examples of some of the commercially available high density polyethylene pellets useful in the present invention are Alathon 7040 and Alathon 7050, available from E. I. DuPont; Marlex 6006, available from Phillips Petroleum; LS-556 from U.S. Industrial Chemicals Co.; and, Gulf Oil Co. pellets 9606. Lower density polyethylenes form softer, more rubbery composites with the crystalline alkyl hydrocarbons that are somewhat less desirable due to their lower compressive strength.

The pellets used in the present invention may range from about 1 micron to 2.0 mm in their largest dimension, and preferably range from about 0.6 to 1.2 mm. While various shapes may be used, the pellets are typically spherically or cylindrically shaped, although elongated particles or cubes can also be used.

The sheets useful as wall or floor coverings in the present invention, are typically about 1.5 to 6.0 mm thick.

Prior to absorbing the alkyl hydrocarbon, the polyethylene pellets and sheets are crosslinked to impart form stability to them. Various methods of crosslinking polyethylene are known. Gamma and electron beam radiation are the most convenient, and therefore, the preferred methods of crosslinking.

The electron beam or gamma radiation dose used in the present invention, is typically in the range of about 2–12 megarads, and preferably, about 6–10 megarads. The amount of irradiation must be adjusted within the aforementioned ranges for the particular pellet or sheet used.

The irradiation dosage within the above ranges does not appear to have a significant effect on the melting point of the polyethylene, but it clearly affects its capacity to absorb phase change material and its thermal form stability. It is essential that an irradiation dosage be selected which crosslinks the polyethylene sufficiently to render it thermally form stable. If the pellets are not sufficiently crosslinked, they may partially fuse together or dissolve during the heating process to imbibe the alkyl hydrocarbon phase change material, or later, upon heating in a thermal energy storage device. At the same time, the pellets and sheets cannot be so heavily crosslinked that they do not absorb the phase change material.

In general, in crosslinking the pellet or sheet, a tradeoff exists between thermal form stability and capacity for phase change material. A radiation dosage should be selected which provides the most desirable balance of these two properties, i.e., thermal form stability with a high capacity for the alkyl hydrocarbon.

The crosslinked matrix may be examined for thermal form stability by placing a sample of it in refluxing ethylene glycol at 145°–165° C. and observing it for adhesion. The matrix should be form stable, i.e., essentially free of adhesion or tack at temperatures up to about 150° C.

When Alathon 7040 pellets receive a total dosage of 2–4 megarads, they fuse into a single mass within 2.5 hours at 145° to 165° C. and are not suitable as a thermal energy storage medium. At 6 megarads, they may adhere together after 72 hours, but the mass is easily crumbled and the pellets are useful as a phase change material. With exposures of 8 megarads or more, the pellets remain free flowing. Similar results are obtained with Marlex 6006 pellets although pellets receiving 8 megarads exposure adhere at their points of contact after 3 hours at 165° C. in refluxing ethylene glycol. USI LS-630 pellets require 10–12 megarad dosages before they are sufficiently thermal form stable to be useful as a storage medium. Gulf Oil 9606 pellets adhere slightly after 96 hours at 165° C. when exposed to 4 megarad levels, but remain essentially free flowing at 8 megarad levels and above.

The crosslinked, high density polyethylene matrix forming the composites of the present invention can also be characterized by a gel content of at least 10%, and more preferably, at least 30%. Resistance to melt flow or thermal flow stability is related to the gel content of the crosslinked material. The final gel content varies with the high density polyethylene used; depending on the product, gel contents of 30–50% and up to 90% may be achieved.

The capacity of the pellets and sheets to absorb the phase change material is equally as important as their form stability and must also be considered in selecting the optimum radiation dosage. For example, these materials may be crosslinked to a state in which they are form stable, but they are not desirable for thermal energy storage due to their low capacity for the phase change material. In accordance with the present invention the degree of crosslinking is controlled such that the pellet or sheet is capable of absorbing at least 10% by weight phase change material, and preferably, at least 50% by weight.

When an electron beam is used to crosslink, the desired irradiation dosage can be achieved with various combinations of electron beam voltage and beam current. It has been found that these conditions should be in the ranges of greater than about 500,000 volts and about 3–33 milliamps to uniformly crosslink the pellets or sheets and achieve the desired thermal form stability and capacity for phase change material. Usually, the maximum beam potential available is used which is typically 3–5 million volts. If the potential is in excess of 10 million volts, residual radiation becomes a factor. Hence, the beam potentials useful in the present invention range from about 500,000 to 10 million volts.

In crosslinking pellets, the depth of the pellet bed and the bed velocity passing across the electron beam must be adjusted to ensure the pellets receive the aforesaid radiation dose. In the case of an extruded sheet, the thickness of the sheet and its velocity determine the radiation dose.

Radiation dose can be expressed by the equation:

$$D = 36 \, F_i \, F_e \, IV / [t \, A/T]$$

where $F_i$ and $F_e$ are the beam current and beam energy efficiencies; $I$ is the beam current; $V$ is the beam potential; $t$ is the bed depth in $g/cm^2$; and $A/T$ is the area thruput in $cm^2/hr$. Hence, to deliver a predetermined dosage $D$, the thickness of the pellet bed or extruded sheet is a function of the beam potential and the area thruput is a function of the beam current. The above equation can be rewritten:

$$D = 360 \, F_i \, F_e \, P/(M/T)$$

by replacing IV with the power of the beam in kilowatts and t A with the mass of the bed or sheet in kilograms thereby illustrating that the mass thruput M/T is a function of beam power.

At potentials on the order of 500,000 volts, the maximum permissible pellet bed depth is about 0.30 cm. At potentials nearing 5 million volts, the bed depth can be up to 1.25 cm. At these voltages and bed depths, equal entrance and exit energy is achieved and the pellets are uniformly penetrated by the electron beam. Similar voltages can be used to process sheets. While it is not necessarily essential to have uniform crosslinking, it is generally desirable. Non-uniformly crosslinked pellets, for example, pellets having a higher degree of crosslinking in the shell than the core, are useful in many applications.

The velocity with which a pellet bed or an extruded sheet can be passed through the electron beam is a function of the beam current. At higher currents within the aforementioned range, higher velocities can be used. Thus, to maximize the rate of production, it is desirable to select the maximum amperage available for the electron beam. In this manner, the pellets or sheets can be processed most efficiently. In some cases, it may be desirable to use multiple passes through the electron beam, for example, where the electron beam is unable to deliver the amperage needed to deliver the requisite radiation dosage in one pass.

In crosslinking pellets, by adjusting the bed depth for the beam potential, equal entrance and exit energies are achieved and it is unnecessary to agitate the pellet bed to achieve uniform crosslinking. Such agitation may be desirable if higher bed depths are used and processed by multiple passes. In such cases, the bed may be agitated by stirring between passes. This technique may be used when processing large quantities although it is preferable to limit the bed depths as above such that irradiation can be conducted in one pass without agitation.

Irradiation in an oxygen containing atmosphere, such as air, is accompanied by the production of ozone which can lead to some surface oxidation. While this occurrence has not been found to be particularly troublesome, it can be avoided by conducting irradiation in an oxygen-free environment, such as a vacuum, nitrogen, carbon dioxide, or similar inert gases. It is not clear that the effects of surface oxidation justify the additional expense of using inert atmospheres, but an improvement in the thermal form stability has been observed in this manner.

A typical example of the irradiation conditions used to crosslink Alathon 7040 pellets is:
Voltage: 3 million volts
Current: 33 milliamps
Pellet Bed Depth: 0.25 to 0.5 inch
Bed Velocity: 16 feet per minute
Atmosphere: air
Passes: 1
Doses: 6 megarads An example of irradiation conditions for the same pellets using multiple passes is:
Voltage: 3 million volts
Current: 20 milliamps
Total Dosage: 8 megarads
Dosage Per Pass: 2 megarads
Passes: 4
Agitation: stirred after each pass
Atmosphere: air Pellets and sheets can also be easily crosslinked through gamma radiation. Dosages in the range of about 4 to 12 megarads may be used. Irradiation is preferably carried out in an inert atmosphere such as nitrogen, helium, hydrogen or a vacuum. It may also be carried out in air, but requires significantly higher total doses than in an inert atmosphere. A nitrogen atmosphere is the lowest cost and therefore, the preferred irradiation atmosphere.

Chemical crosslinking is also feasible. U.S. Pat. No. 4,182,398, which is incorporated herein by reference, discloses several methods for chemical crosslinking high density polyethylene. Under the silane-grafted method, high density polyethylene is charged to a Banbury with vinyl triethoxy silane containing benzoyl peroxide and mixed with steam. These silane-grafted high density polyethylene pieces are then coextruded with a catalyst and crosslinked by heating in boiling water and then air dried.

In a peroxide method, high density oolyethylene powder may be dry blended with dicumyl peroxide, di-t-butyl peroxide, or a similar high temperature free radical generating agent and melt extruded at about 150° to 200° C., and preferably, about 175° C., to crosslink the polyethylene.

In another method, HDPE powder is melted on a mill, and as soon as a smooth sheet of polyethylene is formed, dicumyl peroxide may be added. Dicumyl peroxide is usually reacted in an amount of about 0.1 to 5% by weight, and preferably, about 1% by weight.

The above methods provide crosslinked sheets which can be used in the manufacture of floor or wall coverings or which can be cut into pellets. The crosslinked pellets or sheets are then impregnated with an alkyl hydrocarbon to obtain products in accordance with the present invention.

Processes such as compression or injection molding can also be used to form the pellets, but they tend to be less economical. They are however, useful in forming floor or wall coverings. In accordance with this embodiment of the invention, sheets, tiles, or the like are formed by compression or injection molding and crosslinked simultaneously or afterward by electron beam or gamma radiation as described above.

The straight chain alkyl hydrocarbon is perferably incorporated into the crosslinked HDPE pellet or sheet by immersing the pellets or sheets into a bath of melted straight chain alkyl hydrocarbons. The pellets or sheets are retained in the bath until at least about 10% by weight of the straight chain alkyl hydrocarbon is absorbed. Absorption of about 40 to 80% by weight of the alkyl hydrocarbon is preferred in the case of the pellets. The time/temperature required to achieve this capacity of phase change material will depend on the degree of crosslinking. This degree of absorption is achieved by allowing pellets to remain in a wax melt for about 1 to 2 hours at about 150° to 175° C.

A number of commercially available waxes are useful as phase change materials in the present invention including Shellwax 100 (MP 42°–44° C.), Shellwax 120 (MP 44°–47° C.), Shellwax 200 (MP 52°–55° C.), Shellwax 300 (MP 60°–65° C.), Boron R-152 (MP 65° C.), Union SR-143 (MP about 61° C.), Witco 128 (MP about 53° C.) Witco LLN, Witco 45A, Witco K-61, Witco K-51, and Witco 85010-1, Aristowax 143 (MP 34°-61° C.), and Paraffin 150 (MP about 61° C.). These waxes have heats of fusion greater than 30 cal/g and by comparison to other phase change materials, they are inexpensive. Many of them cost as little as 15¢ (U.S.) per pound when purchased in a tank car quantity.

A preferred group of waxes for use in the present invention are mixtures of crystalline alkyl hydrocarbons which melt in the range of 10 to 50° C. Mixtures of alkyl hydrocarbons are obtained at low cost as by-products of petroleum refining. Because they are inexpensive, they can be incorporated into building materials at minimal additional expense and, at the same time, provide high savings in terms of reduced energy costs. The preferred blends for passive heating have a melting and freezing point in the range of 24° to 33° C. Preferred blends for passive cool storage have a melting and a freezing point in the range of 18° to 33° C. In many applications, the blends will be relied upon for both heating and cooling and will be characterized by both the melting and a freezing point in the range of 20° to 25° C.

Ultra pure alkyl hydrocarbons C-16 to C-22 and higher are also available at a premium cost that may have higher heats of fusion and crystallization (e.g., 55-60 cal/g) than the low-cost mixtures described above. These ultra pure alkyl hydrocarbons are also useful in the present invention for critical applications requiring maximum storage capacity in the minimum volume of space.

Another important consideration in the selection of waxes used in the present invention is the difference between the melting and freezing points. The alkyl hydrocarbons are self-nucleating and thus melt and freeze congruently. Thus, when heated or cooled at rates of 1° C./min. or less, the melting and freezing temperatures coincide. However, it is desirable to have phase change materials that show little or no super cooling even when cooled at rapid rates such as 10° C./min. as in a differential scanning calorimeter test. In any case, the difference between the melting and freezing points of the wax should be less than 10° C. to avoid supercooling. Preferably, this difference is less than 5° C., and more preferably, less than about 3° C., and in many cases, the melting and freezing points are the same.

In addition to providing blends of alkyl hydrocarbons which exhibit phase change characteristics which are intermediate or approximately the average of the individual phase change materials making up the blend, it is also possible to provide a blend which exhibits two or more distinct phase changes. In polyethylene, three phase changes are observed, those of the two or more waxes, plus that of the polyethylene. Such a blend is useful in applications where the phase change material is relied upon to conserve heat in the winter and conserve cool in the summer. For this embodiment of the invention, the difference in the melting points of the phase change materials should be at least 50° C.

Many waxes, as commercially obtained, are not preferred for use in passive energy storage systems as used in climate control, because they melt over a broad range, or their melting points are too high. Consequently, in accordance with the invention, these materials may be combined with crystalline alkyl hydrocarbons having 14-34 carbon atoms and, more specifically, 16 or 28 carbon atoms, in order to bring the melting point of the blend within the range of 16°-42° C.

Further, in the present invention, the crystalline-to-amorphous phase change of the high density polyethylene is preserved in the composite sheets or pellets, with however, the melting point of the HDPE lowered from 132° C. to about 115° C. There is thus provided a dual temperature range thermal energy storage system in which the heat of fusion and crystallization of each component is expressed in proportion to their respective concentration in the composite.

Another embodiment of the present invention utilizes flame-resistant halogenated hydrocarbons as fire-retardant additives to the alkyl hydrocarbon phase change materials. Typical examples of flameresistant hydrocarbons are halogenated hydrocarbons, such as chlorinated or fluorinated hydrocarbons. Representative examples include Chlorowax 70, available from Diamond Shamrock and decabromodiphenylether, available from Ethyl Corp. These halogenated fireretardants can be used in admixture with conventional flame-resistant fillers such as antimony oxide or a blend of pentaerythritol and monoammonium phosphate, etc. The weight ratio of halogenated fire-retardant- to-filler may vary, but it is typically about 1:1 to 3:1. Flame-resistant halogenated fire-retardant formulations have previously been added to polymers to render them self-extinguishing. Some of the fireretardant materials used for this purpose may also be useful as flame-resistant phase change materials by themselves in accordance with the present invention.

The cementitious composition of the present invention includes a cementitious material as a rigid matrix forming material. Typical examples of useful cementitious materials are hydraulic cements, gypsum, plaster of Paris, lime, etc. Portland cement is by far the most widely used hydraulic cement. Portland cements are ordinarily used for construction purposes. Types I, II, III, IV, and V may be used. White cements, air entrained cements, high alumina cements, and masonry cements may also be used.

Concretes are mixtures of hydraulic cements and aggregates. Typical aggregates include conventional coarse aggregates, such as gravel, granite, limestone, quartz sieve, etc., as well as so-called fine aggregates, such as sand and fly ash. Conventional hydraulic cement concretes, for example, Portland cement concretes, employ major amounts, about 50-70% by volume of such aggregates in the set product. These cements and concretes fall within the term "cementitious material" as it is used herein.

The cementitious compositions of the present invention also include concrete and plaster compositions useful in the manufacture of pre-formed materials, such as concrete blocks, dry wall, and the like, as well as in forming poured concrete structures such as used in forming the walls, floors, floor pads, and partitions of buildings. In addition, the compositions of the present invention also include compositions useful in roadway, runway, and bridge deck construction where icing may be prevented by incorporation of the phase change material for thermal energy storage during the day, and release during the night to prevent freezing of the water on the surface. The pellets of the present invention can also be incorporated into bricks, including unfired clay bricks.

The cementitious compositions of the present invention can be designed for use in various passive thermal storage applications by appropriately selecting the melting point of the alkyl hydrocarbons. Alkyl hydrocarbons which melt in the range of about 20°–42° C. are used in passive solar heating, such as in building materials and the structures previously mentioned. For bridge deck or roadway deicing, alkyl hydrocarbons which melt at about 5°–15° C. are preferably used.

A partial listing of building materials which may be modified to incorporate alkyl hydrocarbons as phase change materials in accordance with the present invention includes: concrete block, concrete brick, concrete slab, dry wall, and gypsum board. The amount of alkyl hydrocarbon-containing pellet used in the cementitious or concrete materials is typically about 5 to 25% by weight. The amount will vary with the density of the concrete used. At least 5 weight percent is required for adequate storage capacity. In excess of 25% by weight pellet, usually reduces the strength characteristics of a product to a level at which it is less useful.

Having described the invention in detail and by reference to preferred embodiments thereof, it will be apparent that modifications and variations are possible without departing from the scope of the invention defined in the appended claims.

What is claimed is:

1. A composite useful in thermal energy storage, said composite being formed of a polyethylene matrix containing at least about 10% by weight of a straight chain alkyl hydrocarbon phase change material having at least 14 carbon atoms incorporated therein, said polyethylene being crosslinked to such a degree that said polyethylene matrix is capable of absorbing at least 10% by weight of said straight chain alkyl hydrocarbon phase change material.

2. The composite of claim 1 wherein said polyethylene is high density polyethylene.

3. The composite of claim 2 wherein said composite is a pellet.

4. The composite of claim 3 wherein said high density polyethylene is electron beam or gamma irradiation crosslinked.

5. The composite of claim 3 wherein said pellet contains about 40 to 80% by weight of said straight chain alkyl hydrocarbon.

6. The composite of claim 3 wherein said pellet ranges from about 1 micron to 2 mm in its largest dimension.

7. The composite of claim 3 wherein said high density polyethylene has a density of about 0.940 to 0.970 g/cc.

8. The composite of claim 3 wherein the crystalline alkyl hydrocarbon contains greater than 90% by weight of a single alkyl hydrocarbon having a heat of fusion greater than 50 cal/g.

9. The composite of claim 3 wherein said pellet contains a blend of at least two crystalline straight chain alkyl hydrocarbons having 14 or more carbon atoms and heats of fusion greater than 30 cal/g.

10. The composite of claim 9 wherein said blend has a melting and a freezing point in the range of 18° to 33° C.

11. The composite of claim 10 wherein said blend also contains a flame-retardant additive consisting of a halogenated hydrocarbon.

12. The composite of claim 11 wherein said blend additionally contains antimony oxide.

13. The composite of claim 11 wherein said halogenated hydrocarbon is a chlorinated alkyl hydrocarbon.

14. The composite of claim 9 wherein said composite essentially exhibits a single crystalline alkyl hydrocarbon phase change, plus that of high density polyethylene.

15. The composite of claim 9 wherein said composite exhibits two distinct crystalline alkyl hydrocarbon phase changes, plus that of high density polyethylene.

16. A thermal energy storage material comprising a non-polymeric cementitious matrix having pellets containing a phase change material dispersed therein, said pellets being formed from polyethylene matrix containing at least about 10% by weight of a straight chain alkyl hydrocarbon phase change material having at least 14 carbon atoms, said polyethylene matrix being crosslinked to such a degree that said pellets are form stable and are capable of absorbing at least 10% by weight of said straight chain alkyl hydrocarbon phase change material.

17. The material of claim 16 wherein said polyethylene is high density polyethylene.

18. The material of claim 17 wherein said high density polyethylene is electron beam or gamma irradiation crosslinked.

19. The material of claim 16 wherein said pellets contain about 40 to 80% by weight of said straight chain alkyl hydrocarbon.

20. The material of claim 16 wherein said pellets range from about 1 micron to 2 mm in their largest dimension.

21. The material of claim 17 wherein said high density polyethylene has a density of 0.940 to 0.970 g/cc.

22. The material of claim 16 wherein said concrete material contains about 5 to 25% by weight of said pellets.

23. The material of claim 16 wherein said pellets contain a blend of at least two crystalline straight chain alkyl hydrocarbons having 14 or more carbon atoms and heats of fusion greater than 30 cal/g.

24. The material of claim 23 wherein said blend has a melting point in the range of 18° to 33° C.

25. The material of claim 24 wherein said blend contains a flame-retardant halogenated alkyl hydrocarbon.

26. The material of claim 23 wherein said flame-retardant hydrocarbon is a chlorinated hydrocarbon.

27. The material of claim 16 wherein said nonpolymeric cementitious matrix is hydraulic cement, gypsum, plaster of Paris, or lime.

28. The material of claim 16 wherein said material is a block.

29. The material of claim 16 wherein said material is a brick.

30. The material of claim 16 wherein said material is a slab.

31. The material of claim 16 wherein said material is dry wall.

32. The material of claim 16 wherein said material is a cured cement product.

33. The material of claim 16 wherein said material is a cured plaster.

34. The composite of claim 1 wherein said composite is a sheet useful as a wall or floor covering.

35. The composite of claim 3 wherein said polyethylene has a gel content of at least 30%.

36. The material of claim 17 wherein said polyethylene has a gel content of at least 30%.

* * * * *